J. C. BEAN.
Grain-Drill.
No. 24,530.
Patented June 28, 1859.
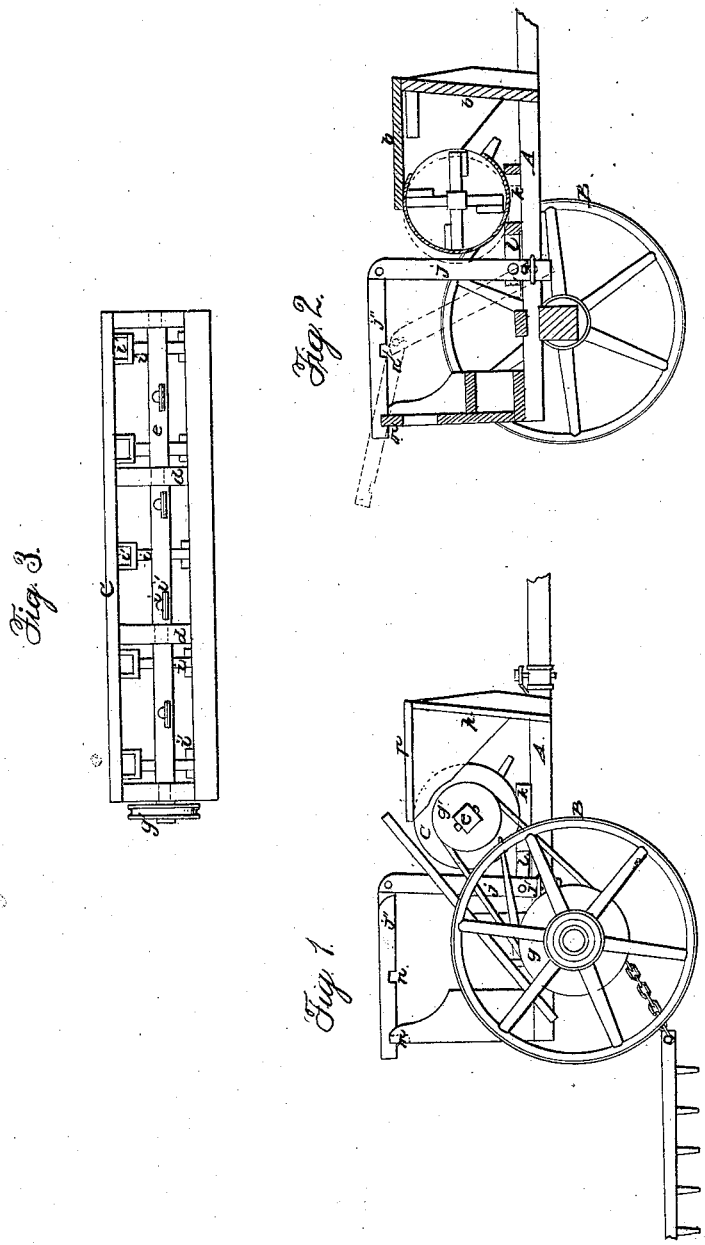

UNITED STATES PATENT OFFICE.

JOSHUA C. BEAN, OF GRAYVILLE, ILLINOIS.

IMPROVEMENT IN SEEDING-MACHINES.

Specification forming part of Letters Patent No. 24,530, dated June 28, 1859.

*To all whom it may concern:*

Be it known that I, JOSHUA C. BEAN, of Grayville, in the county of White and State of Illinois, have invented a new and useful Improvement in Seeding-Machines; and I do hereby declare that the following is a full and clear description thereof, reference being had to the accompanying drawings, and to the letters of reference marked thereon and made to form a part of this specification.

The nature of my invention consists in certain improvements in machinery for sowing grass and other seeds broadcast, as hereinafter specified and represented.

In reference to the accompanying drawings, Figure 1 is a side view, and Fig. 2 a longitudinal sectional view, of the machine. Fig. 3 is a front view of the seed-hopper, showing the device for discharging the seed therefrom.

A represents the frame of the machine, arranged upon wheels B.

Transversely across the frame A is arranged a cylindrical seed-hopper, C, having an opening in front, as shown in Fig. 3, provided with partitions $d$. Within the hopper is arranged a shaft, $e$. Passing at right angles through this shaft $e$ are arms $i$, provided at their extremities with cups $i'$, by means of which the seed contained in said hopper may be discharged. The shaft $e$ is made to receive motion by means of band-wheels $g$ and $g'$. The driving-wheel $g$ is attached to the hub of wheel B. Across the frame A, in front of the opening of the hopper C, is arranged an inclined equalizer, $h$, by means of which seed thrown from the hopper is equalized and allowed to fall evenly upon the ground.

Pivoted to the frame A at $a$ is a jointed lever, $j$, extending from the base $k$ of the hopper C, and pivoted to the lever $j$ at $j'$, is a projection, $l$, by means of which hopper C is adjustable in such a manner as to tighten or loosen the band passing over the band-wheels $g$ and $g'$, as may be required, the said required position being secured by means of notches $n$ in the arm $j''$ of lever $j$ catching upon the back of the seat $m$, as fully shown in Figs. 1 and 2.

Cover $p$ may extend from hopper C to equalizer $h$, to prevent the loss of seed by the wind.

The operation of my machine may be described as follows: The lever $j$ $j''$ being in position shown in Fig. 1, the band thus being tightened upon the wheels sufficiently to operate the shaft $e$, seed being placed in the hopper C, and the machine being made to move forward, the shaft $e$ is made to rotate, as before described, thereby operating the arms $i$ and $i'$, by means of which seed will be discharged from the hopper C against the equalizer $h$, wherefrom it will be allowed to fall upon the ground, as before described. The seed thus deposited upon the ground may be covered by means of a harrow, $t$, attached to the axle-tree of the machine, as shown in Fig. 1.

What I claim as my invention, and desire to secure by Letters Patent, is—

The arrangement of the hopper C and arms $i$ $i'$, in combination with the inclined equalizer $h$, the whole being constructed substantially as and for the purposes set forth.

In testimony of which invention I have hereunto set my hand.

JOSHUA C. BEAN.

Witnesses:
  S. J. ORANGE,
  E. W. BUTLER.